(12) United States Patent
Shen et al.

(10) Patent No.: US 12,430,553 B2
(45) Date of Patent: Sep. 30, 2025

(54) AI TRAINING NETWORK AND METHOD

(71) Applicant: HUAWEI TECHNOLOGIES CO., LTD., Shenzhen (CN)

(72) Inventors: Shengyu Shen, Hangzhou (CN); Yumin Wu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1039 days.

(21) Appl. No.: 17/485,833

(22) Filed: Sep. 27, 2021

(65) Prior Publication Data

US 2022/0012590 A1  Jan. 13, 2022

Related U.S. Application Data

(63) Continuation of application No. PCT/CN2019/113175, filed on Oct. 25, 2019.

(30) Foreign Application Priority Data

Apr. 3, 2019  (WO) ................ PCT/CN2019/081161

(51) Int. Cl.
*G06N 3/08* (2023.01)
*G06N 3/063* (2023.01)
*H04Q 11/00* (2006.01)

(52) U.S. Cl.
CPC ............... *G06N 3/08* (2013.01); *G06N 3/063* (2013.01); *H04Q 11/0005* (2013.01)

(58) Field of Classification Search
CPC .......... G06N 3/08; G06N 3/063; G06N 3/044; G06N 3/045; G06N 3/067; H04Q 11/0005
See application file for complete search history.

(56) References Cited

U.S. PATENT DOCUMENTS

| | | | |
|---|---|---|---|
| 6,907,006 B1* | 6/2005 | Sakamoto | H04L 43/00 370/241.1 |
| 2003/0026524 A1 | 2/2003 | Kakizaki et al. | |
| 2003/0185564 A1 | 10/2003 | Hayashi et al. | |
| 2005/0078959 A1* | 4/2005 | Shin | H04J 14/0273 398/45 |
| 2005/0185958 A1 | 8/2005 | Atsumi et al. | |
| 2007/0292077 A1* | 12/2007 | Holmstrom | G02B 26/08 216/2 |
| 2011/0021936 A1* | 1/2011 | Luo | G16H 40/63 345/604 |
| 2017/0039985 A1 | 2/2017 | Kuo | |

(Continued)

FOREIGN PATENT DOCUMENTS

| CN | 1984006 A | 6/2007 |
|---|---|---|
| CN | 101589322 A | 11/2009 |

(Continued)

*Primary Examiner* — Christine Ng

(57) ABSTRACT

An artificial intelligence training technology, applied to an artificial intelligence training network. Before graphics processing units located on different servers need to communicate with each other, an optical channel used for communication is established in advance. Once a graphics processing unit of a previous server completes calculation of the graphics processing unit, a calculation result can be immediately sent to a graphics processing unit on a next server without waiting or only in a short time period, to reduce duration of artificial intelligence training.

17 Claims, 4 Drawing Sheets

(56) References Cited

U.S. PATENT DOCUMENTS

2018/0041280 A1* 2/2018 Elahmadi ............ H04B 10/2569
2018/0279024 A1* 9/2018 Jiang ...................... H04Q 11/00
2018/0322383 A1 11/2018 Feng et al.
2019/0158647 A1* 5/2019 Vaananen ................ H04L 51/42
2020/0279228 A1* 9/2020 Vaananen ............. H04M 3/527

FOREIGN PATENT DOCUMENTS

| | | | |
|---|---|---|---|
| CN | 101888276 | A | 11/2010 |
| CN | 102546749 | A | 7/2012 |
| CN | 102740177 | A | 10/2012 |
| CN | 105117170 | A | 12/2015 |
| CN | 105871498 | A | 8/2016 |
| CN | 106941633 | A | 7/2017 |
| CN | 107632953 | A | 1/2018 |
| CN | 107885762 | A | 4/2018 |
| CN | 108353217 | A | 7/2018 |
| CN | 208013975 | U | 10/2018 |
| CN | 106664236 | B | 11/2019 |
| EP | 3 326 381 | B1 | 12/2021 |

* cited by examiner

AI TRAINING NETWORK AND METHOD

CROSS-REFERENCE TO RELATED APPLICATIONS

This application is a continuation of International Application No. PCT/CN2019/113175, filed on Oct. 25, 2019, which claims priority to International Application No. PCT/CN2019/081161, filed on Apr. 3, 2019, both of which are hereby incorporated by reference in their entireties.

TECHNICAL FIELD

The embodiments relate to the artificial intelligence field, and in particular, to an AI training network and method.

BACKGROUND

In AI training in the artificial intelligence field, a large quantity of accelerators (for example, the accelerators may be graphics processing units (GPUs) or central processing units (CPUs), and may provide computing power) are used for calculation to calculate an optimal structure parameter of a neural network, so that the network can complete specific work. The AI training is to feed a large amount of data to a machine so that the machine can gradually identify and differentiate objects. For example, an ImageNet1K classification is a common scenario. In this scenario, 1.28 million pictures may be given, including 1000 different objects. In addition, a correct label is provided for each picture, that is, an object type of the picture is provided. A task of the AI training is to find an appropriate neural network architecture (for example, Alexnet) and an assignment of each parameter in the neural network architecture, so that the network can identify the objects in the pictures as correctly as possible.

In a specific implementation, a plurality of accelerators separately perform calculation by using a training algorithm. Respective learning results are combined, and distributed to each accelerator again, and then a next iteration is performed. In this way, after a plurality of rounds of iterative calculation, the machine can learn more key details, thereby becoming more intelligent. Compared with a CPU, a GPU is more suitable for such iterative operation. Therefore, the GPU is more widely applied to the AI training.

As requirements of application scenarios increase, a neural network scale and a data set scale increase sharply. For example, large-scale accelerator server clusters such as Nvidia DGX-2 and Google TPU emerge to improve the computing power. As a scale of an accelerator cluster with high computing power becomes larger, data is transmitted between GPU chips more frequently. Consequently, a speed of data transmission between the GPU chips has increasingly obvious impact on duration of an entire training process. Therefore, how to reduce duration of establishing an optical channel and transmitting the data between the GPU chips is an urgent problem that needs to be resolved currently.

SUMMARY

According to a first aspect, an AI training method is provided, applied to an artificial intelligence AI training network. The AI training network includes a first server, a second server, and an optical cross-connect (OXC) connection. The first server includes a first graphics processing unit. The second server includes a second graphics processing unit. The first server and the second server are separately connected to the OXC. The method includes: performing, by the first graphics processing unit, AI training calculation on a first dataset based on a first data flow diagram; before the first image processing unit completes the AI training calculation on the first dataset, triggering the OXC to start to perform channel switching, where after the channel switching is completed, an optical channel between the first graphics processing unit and the second graphics processing unit is successfully established; after completing computation, sending, by the first graphics unit, a calculation result to the second graphics unit by using the established optical channel; and performing, by the second graphics unit, AI training calculation on the calculation result by using a second data flow diagram.

In the prior art, the method is applied. The first graphics processing unit starts to establish the channel only after completing calculation of the first graphics processing unit (that is, after there is data to be transmitted). Therefore, time has to be taken to wait for establishment of the entire channel. However, in this embodiment, the establishment of the channel is started before there is data to be transmitted. Once the first graphics processing unit located on the first server completes the calculation of the first graphics processing unit, the first graphics processing unit may immediately send the calculation result to a graphics processing unit on a next server. There is no need to wait for the establishment of the channel or only a little time will be taken to wait for the establishment of the channel, so that duration of AI training is reduced.

In a first possible implementation of the first aspect, the AI training network further includes a master server. Further, performing, by the OXC, channel switching includes: receiving, by the OXC, a channel establishment instruction from the master server, where the channel establishment instruction carries an adjustment parameter; and switching, by the OXC, the optical channel based on the adjustment parameter.

This solution is a specific solution for adjusting the OXC.

Based on the first possible implementation of the first aspect, optionally, the master server periodically sends the channel establishment instruction to the OXC. For example, the master server obtains a sending period of the channel establishment instruction based on a time period in which the first graphics processing unit sends data to the second graphics processing unit and a channel switching time point of the OXC.

This solution is a solution in which the OXC is periodically instructed to perform channel switching based on a regularity of data sending between the two graphics processing units.

In a second possible implementation of the first aspect, the OXC is a micro-electro-mechanical system (MEMS) or a silicon photonics (SiP).

According to a second aspect, an AI training network is provided. The network corresponds to the AI training method and has a corresponding beneficial effect.

According to a third aspect, an optical cross-connect management method is provided. An OXC is separately connected to a first server in an AI training network and a second server in the AI training network. The first server includes a first graphics processing unit. The second server includes a second graphics processing unit. The method includes: obtaining a sending period of a channel establishment instruction based on a time period in which the first graphics processing unit sends data to the second graphics processing unit and a channel switching time point of the OXC; and periodically sending a channel switching instruction to the OXC based on the sending period, to instruct the OXC to establish a channel between the first image processing unit and the second image processing unit.

This solution describes how to periodically establish an optical channel in an OXC, to forward timely the data that needs to be sent by the first graphics processing unit to the second image processing unit. After the first graphics processing unit located on the first server completes calculation of the first graphics processing unit, a calculation result may be immediately sent to a graphics processing unit on a next server without waiting or only in a short time. This reduces duration of AI training.

In a first possible implementation of the third aspect, performing, by the OXC, channel switching includes: receiving, by the OXC, a channel establishment instruction from a master server, where the channel establishment instruction carries an adjustment parameter; and adjusting, by the OXC, the optical channel based on the adjustment parameter.

Optionally, based on the first possible implementation of the third aspect, the master server periodically sends the channel establishment instruction to the OXC. In addition, before the first graphics processing unit performs AI training calculation on a first dataset based on a first data flow diagram, this solution further includes: obtaining the sending period of the channel establishment instruction based on the time period in which the first graphics processing unit sends the data to the second graphics processing unit and the channel switching time point of the OXC.

In a second possible implementation of the third aspect, before the first graphics unit completes the calculation, the channel switching is completed.

In a third possible implementation of the third aspect, the OXC is a MEMS or a SiP.

According to a fourth aspect, an optical cross-connect management server, for example, the master server, is provided. The optical cross-connect management server may execute an optical cross-connect management method, and has a corresponding effect.

According to a fifth aspect, a computer-readable storage medium is provided. The computer-readable storage medium stores an instruction, and a processor of a computer runs the instruction to perform the first aspect or any possible implementation of the first aspect.

According to a sixth aspect, a computer program product is provided. The computer program product includes an instruction, and a processor of a computer executes the instruction to perform the first aspect or any possible implementation of the first aspect.

DETAILED DESCRIPTION OF THE EMBODIMENTS

Figure 1:
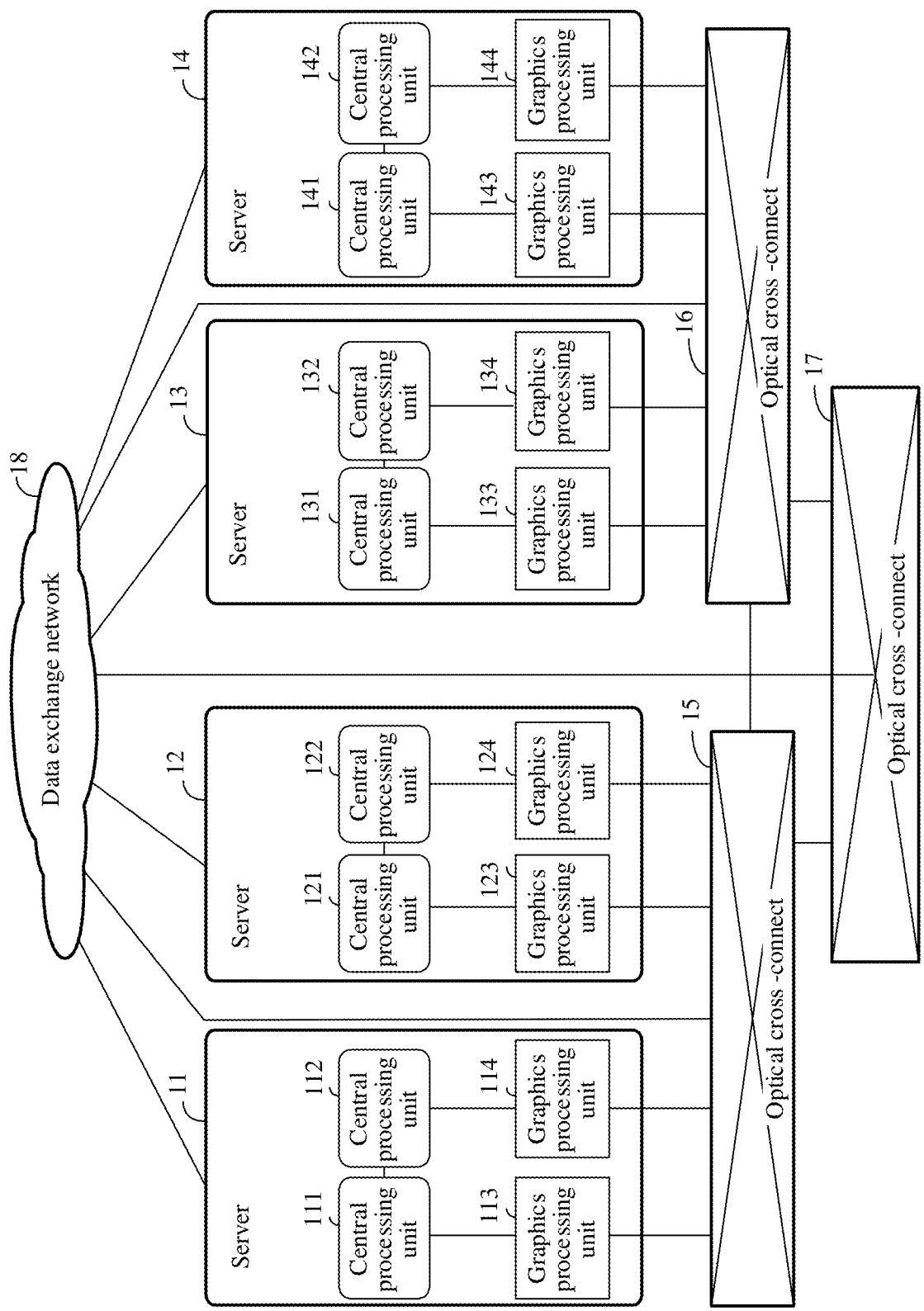
FIG. 1 is an architectural diagram of an embodiment of an AI training network.

An artificial intelligence (AI) training network includes a server array formed by a plurality of servers, and AI training is performed by running an AI program. FIG. 1 provides an architecture of the AI training network. As shown in the figure, an array includes a server 11, a server 12, a server 13, and a server 14, and the array further includes an optical cross-connect 15, an optical cross-connect (OCX) 16, and an optical cross-connect 17. The servers in this embodiment may be devices having computing power, such as dedicated servers, general-purpose servers, workstations, or notebook computers. The servers may communicate with each other by using a data exchange network 18. The data exchange network 18 is, for example, an Ethernet or a fiber channel (FC). Of these servers interconnected by using the data exchange network, a server in the figure may be used as a master server, and remaining servers are used as slave servers. The master server may send a command to another server by using the data exchange network 18. In addition, the master server may receive an instruction and raw data of the AI training outside the array by using the data exchange network 18. The master server may be selected by using a program between the servers or may be specified by a third party. For ease of description, the server 11 is defined as the master server, and the other servers are the slave servers. It should be noted that, in an actual array, there are more components and devices, for example, a network interface card, a memory (e.g., RAM), and an input/output device of a server, an Ethernet switch and a router on the data exchange network 18. For brief description, the components and devices are not shown in FIG. 1.

In a complete AI training process, the following steps are iteratively performed until a calculation result converges to sufficient precision. (1) Forward propagation: a tensorflow (TF) inputs input data into a neural network on the left of the figure, and runs operators in sequence based on an operator dependency relationship until the calculation result is obtained on the right of the figure. (2) Calculate a loss: the loss is a difference between the obtained result in step (1) and a correct answer. (3) Backward propagation: according to a chain derivation rule, the loss in step (2) is propagated backward level by level to obtain gradients of all parameters. (4) when a loss value of each iteration tends to be flat and no sharp decrease occurs, convergence may be formed. It can be understood from features of iterative performing of the steps (1), (2), and (3) that a calculation amount and a communication feature of the AI training are iteratively repeated. After several iterations, it is possible to accurately predict when a packet is to be sent, how large the packet is, and from which GPU to which GPU the packet is to be sent.

A server includes a central processing unit (CPU) and a graphics processing unit (GPU). For example, the server 11 includes a CPU 111, a CPU 112, a GPU 113, and a GPU 114. The CPU 111 and the CPU 112 may communicate with each other by using a bus (for example, a quick path interconnect QPI bus or a hyper-transmission HT bus) or a node controller (NC). Communication between the CPU 111 and the GPU 113 and between the CPU 112 and the GPU 114 may be performed by using a peripheral component interconnect express (PCIe) bus. In addition to PCIe, ISA, PCI, AGP, AGI, and AGU are also available GPU interface standards. The CPU delivers a calculation command to the GPU, and the GPU completes the calculation command delivered by the CPU.

Each server may run an operating system (OS). An AI training program, for example, a tensorflow (TF) program, a CNTK, a Caffe, or an MXNET may run on the OS. The AI training software TF requires a user to first provide a structure of the neural network, which is referred to as a data flow diagram. The data flow diagram includes a plurality of operators. The operators may be matrix multiplication, average value calculation, maximum value calculation, sigmoid activation function, and the like. There is a dependency relationship between some operators. For example, an output result calculated by one operator is used as input data of another operator. The array has a large quantity of GPUs. To improve calculation efficiency, the operators need to be distributed to a plurality of GPUs so that the plurality of GPUs may jointly complete data flow diagram calculation. A dependency relationship between the operators allocated to the GPUs also causes a dependency relationship between the GPUs. For example, an output result of a previous GPU is used as input data of a next GPU. Because of the dependency relationship, communication between the GPUs is required. Therefore, in addition to a calculation operator (the calculation operator is used for function calculation), operators allocated to the two GPUs further include a communication operator (the communication operator is used for the communication between the GPUs).

The two GPUs that communicate with each other may belong to a same server or may belong to different servers. When the two GPUs that communicate with each other belong to the same server, the communication may be performed by using a bus inside the server. However, when the two GPUs that communicate with each other belong to the different servers, the communication needs to be performed by using a communication channel outside the servers, in other words, by using the optical cross-connects (OXC) in FIG. 1. For example, data sent by the GPU 113 can reach the GPU 144 after successively passing through the OXC15, the OXC16, and the OXC17. The OXCs are also connected to the data exchange network 18 by using an Ethernet or an FC, to receive a command from the server CPU through the Ethernet, and adjust a connection between an input and an output of an optical switch based on the command. An OXC device includes, but is not limited to, a micro-electro-mechanical system (MEMS), and a silicon photonics (SiP). The MEMS is a micron-sized mechanical system. A machining technology of the MEMS is transformed from a semiconductor machining technology. The MEMS is operated within micron. The MEMS optical switch mentioned in the embodiments is an array formed by reflectors that are manufactured by using a MEMS process and that can deflect based on an external instruction, and is configured to reflect an incident light beam to a specific direction. The light beam may be propagated in free space. A disadvantage of the MEMS is that a speed of channel switching (switching from an original channel to a newly established channel) is slow, which is about 10 ms. The speed is 6 orders of magnitude less than an ns level of electrical switching. The silicon photonics is an optical system that uses a silicon chip as a light conduction medium. Different from the MEMS, the silicon chip implements beam propagation and direction keeping at the same time by using a waveguide channel. The silicon photonics can provide a faster channel switching speed than the MEMS.

However, regardless of the MEMS or the silicon photonics, time of switching from the original channel to the new channel cannot be ignored in terms of time consumed for the AI training. Therefore, reducing the switching time to reduce the overall time consumed for the AI training is a problem that needs to be resolved. Time consumed for data transmission between GPU chips includes two parts: time consumed for switching data on a channel and time consumed for actual data transmission. In this embodiment, the channel may be switched in advance before the data needs to be transmitted. When the data needs to be transmitted, an existing channel may be directly used, thereby reducing impact of a switching process on calculation time of the AI training.

Figure 2:
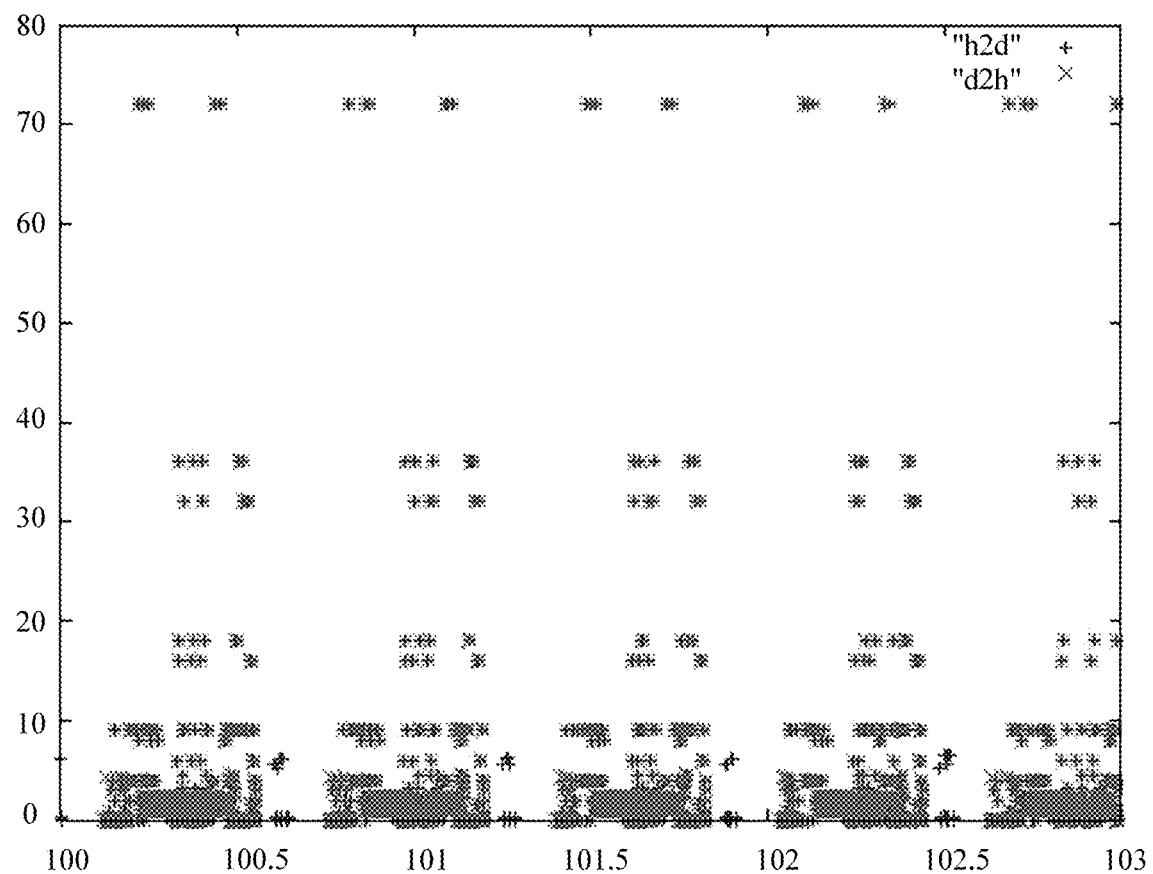
FIG. 2 is a diagram of measuring data traffic between image processing units.

FIG. 2 is a diagram of data traffic between two GPUs captured by using a software interface in a real AI training process. In the figure, a horizontal coordinate is time (unit: second), a vertical coordinate is a data size (unit: megabyte), and each mark point represents one data transmission. It can be seen from the figure that data transmission has obvious time periodicity: frequent data transmission occurs at an interval of an idle period which is about 200 ms, and such frequent transmission ends after lasting for about 500 ms. Most sizes of transmitted data are less than 5 MB; some are within a range of 5 MB to 10 MB; and a few are within a range of 10 MB to 20 MB or a range of 30 M to 40 M. Based on statistics, a total quantity of packets transmitted in each period are in GB. In another implementation scenario, there may be an occasional case in which the periodicity is not regular. However, in most cases, the periodicity is still available. Therefore, a benefit may still be obtained by using the solution provided in this embodiment.

Therefore, in this embodiment, a channel switching instruction is sent to an OXC in advance by using high repetition specificity and predictability of AI training traffic, to trigger channel switching. A first channel switching occasion: the OXC may be instructed to establish a transmission channel before calculation of a previous GPU is completed, and the channel switching is completed before the calculation of the previous GPU is completed. After the channel switching is completed, the data may be directly sent to a next GPU. In this way, the channel is not temporarily established when there is data transmission, and a high delay caused by a low switching speed of the OXC is avoided. Based on the statistics in FIG. 2, it may be known that data is generated periodically. A master server may predict a later moment at which data is generated (namely, a moment at which traffic occurs) and time required for the channel switching based on a moment at which data was generated and may calculate a latest moment for triggering the OXC to start channel establishment. As long as the OXC starts channel switching at a moment that is equal to or slightly earlier than the latest moment, a new channel may be established before to-be-transmitted data is generated.

A second channel switching occasion: the transmission channel is established before the calculation of the previous GPU is completed (the channel switching does not need to be completed before the calculation of the previous GPU is completed). In this case, the occasion is more flexible, and the channel switching may be completed before the calculation of the previous GPU is completed, or the channel switching may be completed after data generation is completed. Therefore, the second channel switching occasion covers the first channel switching occasion. If the OXC is triggered to perform the channel switching at the second channel switching occasion, the calculation of the previous GPU may be completed before the channel switching is completed. Because the data can only be transmitted after the channel switching is completed, the previous GPU needs to wait for a period of time before sending the data to the next GPU. However, compared with the prior art (the channel switching is triggered only when there is data to be transmitted), because a start time of the channel switching is advanced, time is still reduced.

Figure 3:
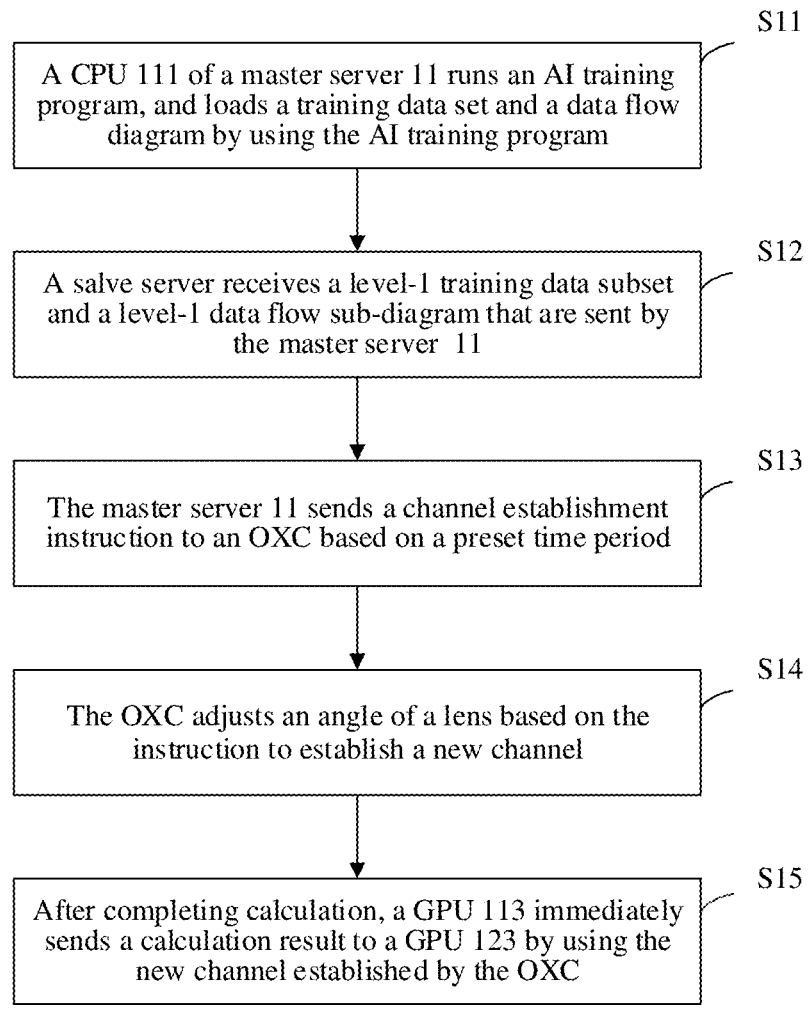
FIG. 3 is a flowchart of an embodiment of AI training.

Referring to FIG. 3, a process of an embodiment of AI training is described in more detail below.

Step S11: The CPU 111 of the master server 11 runs an AI training program and loads a training data set and a data flow diagram by using the AI training program. The master server 11 splits the training data set and the data flow diagram into several parts, and separately sends the several parts to the slave server 12, the slave server 13, and the slave server 14 by using the data exchange network 18, so that each server shares a part of a training task. Of each slaver, a received part of the data flow diagram is used to calculate a received part of the data set. In other words, there is a correspondence between the received part of the data flow diagram and the received part of the data set. If training tasks of all the servers are combined, the training data set and the data flow diagram may be formed.

In addition to performing a scheduling function, the master server 11 may further undertake calculation of a part of the training data set and a part of the data flow diagram. Alternatively, the master server 11 may not undertake a calculation task, and only performs the scheduling function. The master server 11 has a processor and an interface. The interface is configured to communicate with an OXC. If the master server undertakes the calculation task, a graphics processing unit may further be included. In this embodiment, there are four servers in total. Assuming that the calculation task is evenly allocated among the four servers, each server processes a ¼ training data set and a ¼ data flow diagram corresponding to the ¼ training data set. For ease of subsequent description, a part of the training data set for which a single server is responsible is referred to as a level-1 data subset, and a part of the data flow diagram for which the single server is responsible is referred to as a level-1 data flow sub-diagram.

Step S12: The slave servers receive level-1 training data subsets and level-1 data flow sub-diagrams that are sent by the master server 11. CPUs of the slave servers split the level-1 training data subsets and the level-1 data flow sub-diagrams again based on a quantity of GPUs. One level-1 data subset is split into a plurality of level-2 data subsets. One level-1 data flow sub-diagram is split into a plurality of level-2 data flow sub-diagrams. Then, the level-2 subsets of the data and the level-2 data flow sub-diagrams are sent to corresponding GPUs, and each GPU is instructed to perform calculation on a received level-2 data subset based on a received level-2 data flow sub-diagram.

Each server starts to calculate, based on a level-1 data flow sub-diagram of the server, a level-1 data subset for which the server is responsible. A specific calculation operation is performed by the GPU. The server 12 is used as an example. After the ¼ training data set and the ¼ data flow diagram that need to be calculated by the server 12 are received by using the data exchange network 18, a CPU (a CPU 121 and/or a CPU 122) of the server 12 allocates a calculation task to a home GPU. For example, a GPU 123 and a GPU 124 separately undertake a ⅛ training data set and a ⅛ data flow diagram.

Step S13: The master server 11 (for example, the CPU 111 or the CPU 112) sends a channel establishment instruction to the OXC based on a preset time period. As described above, there may be a dependency relationship between the GPUs. Due to the dependency relationship, the GPUs periodically send a large amount of data to each other. FIG. 2 is used as an example, the master server 11 periodically sends an instruction to the OXC. In the example shown in FIG. 2, sending duration is approximately 0.5 s (500 ms), an interval for sending a packet is about 0.2 s (200 ms). Therefore, the time period may be about 700 ms (200 ms+500 ms). In this case, a corresponding channel is established at an interval of 700 ms.

Figure 4:
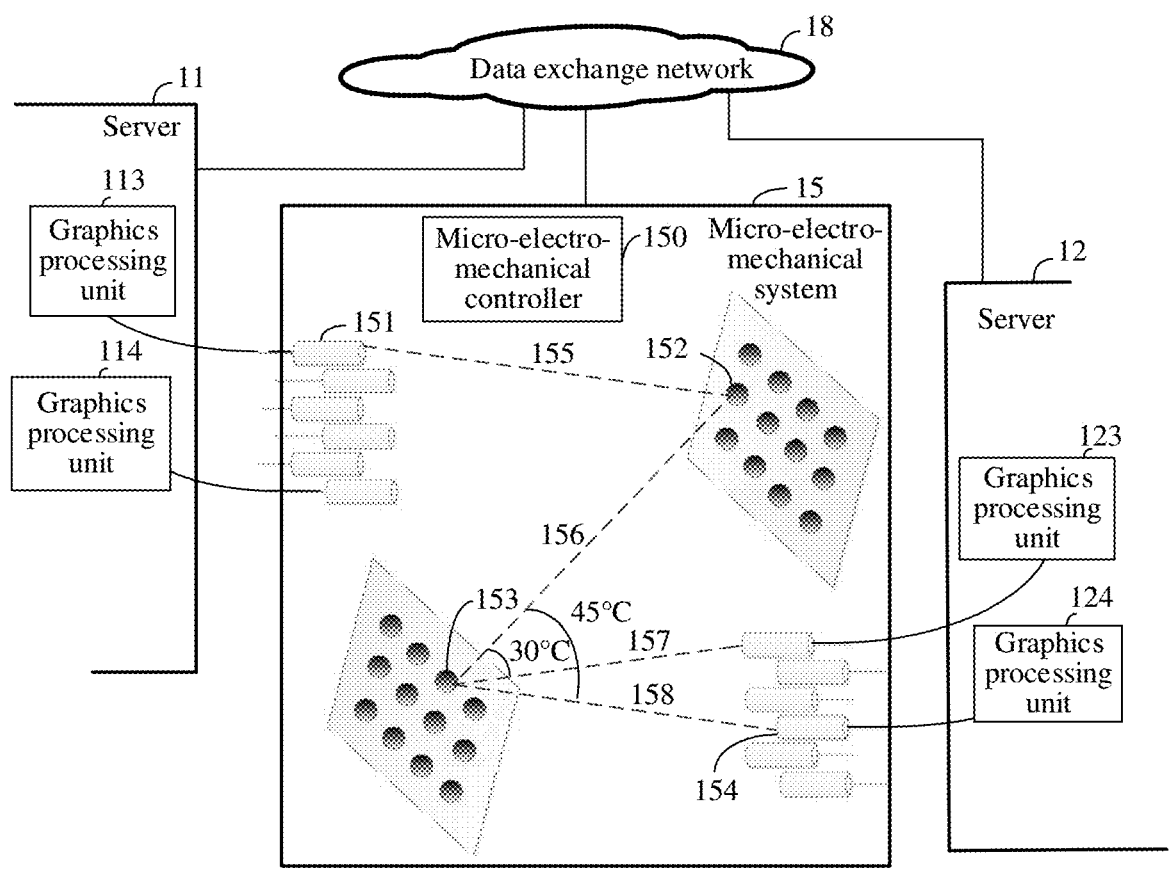
FIG. 4 is a schematic diagram of an embodiment of switching an optical channel in a micro-electro-mechanical system.

The channel establishment instruction includes an adjustment parameter and is used to instruct to the OXC to adjust an optical channel based on the adjustment parameter. In this embodiment, the adjustment parameter includes a sequence number of a lens that needs to be adjusted and an angle that needs to be adjusted. Referring to FIG. 4, in this embodiment, it is assumed that input of the GPU 123 (a second graphics processing unit) depends on output of the GPU 113 (a first graphics processing unit). In this case, the lens that needs to be adjusted is an OXC located between the GPU 123 and the GPU 113, namely, a MEMS 15. The MEMS 15 includes a micro-electro-mechanical controller 150 and two reflection lens arrays. Each lens array includes a plurality of reflectors, and a lens deflection angle is physically adjustable. An electrical signal sent by the GPU 113 is converted into an optical signal and reaches the GPU 124 after passing through a fiber channel 151, a reflector 152, a reflector 153, and a fiber channel 154. As shown in FIG. 4, before adjustment, a deflection angle increased by a reflector is 45°, and a reflection path of the optical signal is 155-156-158. In this case, if the GPU 113 sends data, the data reaches the GPU 124. Adjusting an angle of the lens 152 and/or an angle of the lens 153 may modify the reflection path. Once the reflection path is modified, it means that a new channel is successfully established. In this embodiment, the reflector 153 is adjusted. After an increased reflection angle of the reflector 153 is adjusted to 30°, a channel between the GPU 113 and the GPU 123 is successfully established. The adjustment parameter included in the channel establishment instruction sent by the master server 11 to the OXC 15 is, for example, {reflector 15, an angle of the reflector 30°}.

For ease of description, alternatively, a training data set and a data flow diagram that need to be undertaken by the GPU 113 (the first graphics processing unit) may be respectively referred to as a first training data set and a first data flow diagram; and a training data set (a calculation result of the GPU 113) and a data flow diagram that need to be undertaken by the GPU 123 (the second graphics processing unit) may be respectively referred to as a second training data set and a second data flow diagram.

It should be noted that, in this embodiment, an occasion on which the master server 11 (for example, the CPU 111 or the CPU 112) sends the channel establishment instruction to the OXC based on the preset time period may be earlier than an occasion on which the GPU 113 sends data to the GPU 123, to trigger channel establishment in advance. Once the GPU 113 completes calculation, the GPU 113 may immediately send a signal to the GPU 123 by using this channel. Therefore, in this embodiment, the following limitation may be added: Before the GPU 113 completes calculation of the training data set allocated by the GPU 113, the channel between the GPU 113 and the GPU 123 needs to be established first. For example, a time period of sending the data by the GPU 113 to the GPU 123 is 2 seconds. For example, the GPU 113 needs to send the data to the GPU 123 at a time of 10 seconds, 12 seconds, 14 seconds, or the like. Channel establishment needs to take 0.4 seconds. In this case, the master server 11 may notify the OXC of starting to establish the channel between the GPU 113 and the GPU 123 before a time of 9.6 seconds, 11.6 seconds, 13.6 seconds, or the like. In this example, compared with the prior art, a channel establishment time of 0.4 seconds is saved.

It should be noted that, in another embodiment, the limitation that "before the GPU 113 completes calculation of the training data set allocated by the GPU 113, the channel between the GPU 113 and the GPU 123 needs to be established first" is not mandatory. In another embodiment, the channel establishment may not be limited to be completed before the GPU 113 completes the calculation, provided that the channel establishment is started before the GPU 113 completes the calculation. For example, the GPU 113 needs to send the data to the GPU 123 at the time of 10 seconds, 12 seconds, 14 seconds, or the like, and the channel establishment needs 0.4 seconds. In this case, the master server 11 may notify the OXC of starting to establish the channel between the GPU 113 and the GPU 123 at a time of 9.7 seconds, 11.7 seconds, 13.7 seconds, or the like. In this example, after completing the calculation, the GPU 113 needs to wait 0.1 seconds before sending the data to the GPU 123 by using the channel. Compared with the prior art, a channel establishment time of 0.3 seconds is saved. Alternatively, the master server 11 may notify the OXC of starting to establish the channel between the GPU 113 and the GPU 123 at a time of 9 seconds, 11 seconds, 13 seconds, or the like. In this example, the GPU 113 completes the calculation 0.2 seconds after the channel is established. Compared with the prior art, a channel establishment time of 0.4 seconds is saved.

It should be noted that functions performed by the master server 11 in steps S13 to S15, for example, sending the channel establishment instruction and receiving a response to the channel establishment instruction, are not limited to being performed by the master server 11, and may be performed by another server in the cluster or a third-party device.

It should be noted that there is no dependency relationship between step S12 and step S13. The two steps may be executed concurrently or one of them may be performed first.

Step S14: The MEMS 15 receives the channel establishment instruction that includes the adjustment parameter {reflector 15, an angle of the reflector 30°}, and the MEMS controller 150 adjusts the angle of the reflector 15 based on the instruction, where an angle of a reflected light after adjustment is 30°.

After the adjustment, a reflection path 155-156-157 of the optical signal is established. In other words, channel switching between the GPU 113 and the GPU 123 is completed. The micro-electro-mechanical system 15 sends a response message that the channel is successfully established to the master server 11, to notify the master server 11 that the channel between the GPU 113 and the GPU 123 is successfully established. After the master server 11 receives the response message, the CPU of the master server 11 notifies the GPU 113 of a channel establishment success message.

Step S15: After the GPU 113 receives a notification sent by the master server 11, if the calculation has been completed, the calculation result may be immediately sent to the GPU 123 by using the optical path 155-156-157, and the GPU 123 performs subsequent calculation by using the received data; if the calculation is not completed, after the calculation is completed, the calculation result may be immediately sent to the GPU 123 by using the optical path 155-156-157. After receiving the calculation result of the GPU 113, the GPU 123 further performs calculation based on the data flow sub-diagram of the GPU 123.

It can be understood from the steps that once the GPU 113 completes the calculation, an existing channel in the MEMS 15 is used by the GPU 113. Therefore, the data may be immediately sent to the GPU 123 by using the MEMS 15. Because there is no need to wait for the channel establishment, time is saved. For the MEMS, each cross-server GPU communication can save about 10 ms. However, in one AI training, a server array needs to frequently transmit a signal between GPUs of different servers. Therefore, a large amount of time can be saved by applying this embodiment.

The "preset time period" is mentioned in step 13, and the lenses in the OXC are flipped in advance based on the time period. The following describes how to obtain the period by using an example. It should be understood that there may be more methods for obtaining the time period, and two methods are provided herein to deepen understanding of the embodiment by persons of ordinary skill in the art.

Method 1: Set by an administrator. for AI training of a same type, a time period is similar. Therefore, the administrator can master the time period based on experience and manually set a value of the period in software.

Method 2: Obtain from a server array. For GPUs that need to perform communication between each other, a sub-data flow diagram received by a GPU may include a calculation operator and a communication operator. The communication operator may describe a dependency relationship between the GPUs. There is a sending operator in a sub-data flow diagram of a GPU that needs to send data, and there is a receiving operator in a sub-data flow diagram of a GPU that needs to receive the data. When the GPU uses the communication operator to transmit the data, information about transmission of the data may be recorded, such as a source GPU, a destination GPU, an amount of the transmitted data, and a time that the data transmission occurs. The traffic diagram between the GPUs shown in FIG. 2 may be obtained by using the information (the related information may be recorded by the source GPU or the destination GPU or may be recorded by both), to master regularity of data transmission between the GPUs. The information may be stored in a memory of a server on which the GPU is located, or may be aggregated to a unified storage location, for example, aggregated to a memory of a master server, or aggregated to a third-party device outside the server array. After a period of continuous recording, the software may master a time period, and store the time period in a readable storage location.

Method 3: Obtain by using neural network training. Traffic and time that occur between GPUs are recorded, and a time point at which traffic is to occur and a traffic volume are predicted by using a neural network algorithm (for example, a time sequence estimation algorithm or another algorithm), to obtain a time period.

For example, it is assumed that received data is a sequence formed by a four-tuple tuplei=<timei, srci, dsti, sizei>. timei describes a moment at which an ith packet is transmitted, srci describes a source GPU that sends the packet, dsti describes a destination GPU that receives the packet, and sizei describes a size of the ith packet. In this way, S=<tuple0, tuple1, tuple2 . . . > is formed by S four-tuples. Some tuples in the S are input to a neural network model (for example, an LSTM model constructed by using tensorflow) for training to obtain a training model.

The traffic between the GPUs and the time point at which the traffic occurs may be predicted by using the training model, to obtain a time period in which periodic heavy-traffic transmission is to occur between the GPUs. For example, a model Mmn is trained based on each pair of specific <srci, dsti>=<GPUm, GPUn>. By using some tuples in S=<tuple0, tuple1, tuple2 . . . > as input, the Mmn model may predict that GPUm is a source GPU, and GPUn is a destination GPU, and predict a time point at which a packet is to be sent and a size of the packet.

It should be noted that the tuples used for training and the tuples used for prediction both come from the S. The tuples used for training and the tuples used for prediction may be completely different, or some of the tuples may be the same (while other tuples are different). For example, tuple0 to tuple200 are used for training to obtain a model. From tuple201, subsequent tuples are used for prediction.

It should be noted that not all packet transmission between the GPUs needs to be input into the neural network as a four-tuple for training A packet that may not input a corresponding four-tuple into the neural network, includes but is not limited to: a packet with a relatively small size (for example, data that is less than 400 KB); a packet in a warm-up calculation phase when a training process is started (in this case, data storage and calculation pipelines at all levels have not reached a stable state, and an entire calculation process fluctuates greatly); or a management packet for detecting a node status. In addition, optionally, for ease of calculation, timei may be rounded by using µs. For example, 75.1 us is rounded to 75 µs.

Method 5: When the first graphics processing unit performs AI training calculation on the first dataset based on the first data flow diagram, a sending time point at which the first graphics unit sends a calculation result to the second graphics unit by using the optical channel is predicted based on a prediction algorithm; and after the prediction is completed, a channel switching instruction is sent to the OXC, to instruct the OXC to perform channel switching. There are a plurality of prediction algorithms. For example, a neural network is used to predict or count a sending period in which the first graphics processing unit sends data to the second image unit. A sending time in which the first graphics unit sends the calculation result to the second graphics unit by using the optical channel is predicted based on the sending period. For example, based on statistics, in most cases, the first graphics unit sends the calculation result to the second graphics unit every 500 ms by using the optical channel. In this case, it may be predicted that a moment at which the first graphics processing unit next sends a training result to the second image unit is a moment at which the first graphics processing unit last sends the training result to the second graphics processing unit added with duration of 500 ms.

Another embodiment provides for a program product, running in a master server. The program product includes program code, and the master server may manage an OXC by running the program code. For example, the master server obtains a sending period of a channel establishment instruction based on a time period in which the first graphics processing unit sends data to the second graphics processing unit and a channel switching time point of the OXC; and periodically sends a channel switching instruction to the OXC based on the sending period, to instruct the OXC to establish a channel between the first image processing unit and the second image processing unit.

What is claimed is:

1. An AI training method, applied to an artificial intelligence (AI) training network, wherein the AI training network comprises a first server, a second server, and an optical cross-connect (OXC) connection, the first server comprises a first graphics processing unit, the second server comprises a second graphics processing unit, the first server and the second server are separately connected to the OXC connection, and the method comprises:
    performing, by the first graphics processing unit, first AI training calculation on a first dataset based on a first data flow diagram, and, before the first graphics processing unit completes the first AI training calculation on the first dataset, triggering the OXC to start to perform channel switching, wherein after the channel switching is completed, an optical channel between the first graphics processing unit and the second graphics processing unit is successfully established;
    after completing the first AI training calculation, sending, by the first graphics processing unit, a calculation result to the second graphics processing unit by using the established optical channel; and
    performing, by the second graphics processing unit, second AI training calculation on the calculation result by using a second data flow diagram.

2. The AI training method according to claim 1, wherein the AI training network further comprises a master server, and performing, by the OXC, channel switching comprises:
    receiving, by the OXC, a channel establishment instruction from the master server, wherein the channel establishment instruction carries an adjustment parameter; and
    switching, by the OXC, the optical channel based on the adjustment parameter.

3. The AI training method according to claim 2, further comprising:
    periodically sending, by the master server, the channel establishment instruction to the OXC.

4. The AI training method according to claim 2, wherein before the performing, by the first graphics processing unit, of the first AI training calculation on a first dataset based on a first data flow diagram, the method further comprises:
    obtaining a sending period of the channel establishment instruction based on a time period in which the first graphics processing unit sends data to the second graphics processing unit and a channel switching time point of the OXC.

5. The AI training method according to claim 4, wherein obtaining the time period comprises:
    obtaining a sending time point and a size of a packet that has been sent between the first graphics processing unit and the second graphics processing unit and estimating the time period through calculation by using a neural network.

6. The AI training method according to claim 1, wherein a time point at which the channel switching is completed is a time before the first graphics processing unit completes the first AI training calculation.

7. The AI training method according to claim 1, wherein the OXC is a micro-electro-mechanical system (MEMS) or a silicon photonics (SiP).

8. The AI training method according to claim 1, wherein before the first graphics processing unit completes the first AI training calculation on the first dataset, the triggering of the OXC to start to perform channel switching comprises:
    when the first graphics processing unit performs the first AI training calculation on the first dataset based on the first data flow diagram, predicting a sending time point at which the first graphics processing unit sends the calculation result to the second graphics processing unit by using the optical channel; and
    after the prediction is completed, instructing the OXC to perform channel switching.

9. An AI training network, wherein the AI training network comprises a first server, a second server, and an optical cross-connect (OXC) connection, the first server comprises a first graphics processing unit, the second server comprises a second graphics processing unit, and the first server and the second server are separately connected to the OXC connection;
    the first graphics processing unit is configured to: perform first AI training calculation on a first dataset based on a first data flow diagram, and send a calculation result to the second graphics processing unit by using an established optical channel;

the optical cross-connect OXC is configured to: before the first graphics processing unit completes the first AI training calculation on the first dataset, start to perform channel switching, wherein after the channel switching is completed, the optical channel between the first graphics processing unit and the second graphics processing unit is successfully established; and the second graphics processing unit is configured to: perform second AI training calculation on the calculation result by using a second data flow diagram.

10. The AI training network according to claim 9, wherein the AI training network further comprises a master server, and the master server is configured to:

send a channel establishment instruction to the OXC, wherein the channel establishment instruction carries an adjustment parameter; and the OXC performs channel switching on the optical channel based on the adjustment parameter.

11. The AI training network according to claim 10, wherein the master server is further configured to:

periodically send the channel establishment instruction to the OXC.

12. The AI training network according to claim 11, wherein the master server is further configured to:

obtain a sending period of the channel establishment instruction based on a time period in which the first graphics processing unit sends data to the second graphics processing unit and a channel switching time point of the OXC.

13. The AI training network according to claim 12, wherein the master server is configured to:

obtain a sending time point and a size of a packet that has been sent between the first graphics processing unit and the second graphics processing unit and estimate the time period through calculation by using a neural network.

14. The AI training network according to claim 10, wherein the master server is configured to:

when the first graphics processing unit performs the first AI training calculation on the first dataset based on the first data flow diagram, predict a sending time point at which the first graphics processing unit sends the calculation result to the second graphics processing unit by using the optical channel; and after prediction is completed, send the channel switching instruction to the OXC.

15. The AI training network according to claim 9, wherein the OXC is further configured to:

complete the channel switching before the first graphics processing unit completes the first AI training calculation on the first dataset.

16. The AI training network according to claim 9, wherein the OXC is a micro-electro-mechanical system (MEMS) or a silicon photonics (SiP).

17. An optical cross-connect (OXCOCX) management server, wherein the management server communicates with an OXC, the OXC communicates with a first server in an AI training network and a second server in the AI training network, the first server comprises a first graphics processing unit, the second server comprises a second graphics processing unit, the optical cross-connect management server comprises a processor, and the processor is configured to:

obtain a sending period of a channel establishment instruction based on a time period in which the first graphics processing unit sends data to the second graphics processing unit and a channel switching time point of the OXC; and periodically send a channel switching instruction to the OXC based on the sending period, to instruct the OXC to establish, before the first graphics processing unit completes AI training calculation on a first dataset, a channel between the first graphics processing unit and the second graphics processing unit.

* * * * *